United States Patent [19]
Boothe et al.

[11] Patent Number: 4,536,925
[45] Date of Patent: Aug. 27, 1985

[54] BELT CLIP ASSEMBLY WITH A CONTROLLED FAILURE MODE

[75] Inventors: Nancy G. Boothe, Brighton, Mass.; Anthony M. Potts, Lauderdale Lakes, Fla.

[73] Assignee: Motorola, Inc., Schaumburg, Ill.

[21] Appl. No.: 540,972

[22] Filed: Oct. 11, 1983

[51] Int. Cl.³ .............................................. A45F 5/02
[52] U.S. Cl. ......................................... 24/511; 16/222; 24/3 J; 24/67.7; 24/704; 224/269; 248/548; 403/2; 455/351
[58] Field of Search .................. 24/3 R, 3 G, 3 H, 3 J, 24/3 L, 67.7, 487, 489, 499, 500, 509, 510, 511, 508, 602, 704; 403/2; 455/351; 224/269, 271, 272, 252; 248/547, 548; 52/98; 16/267, 222, 385, DIG. 13; 312/328

[56] References Cited

U.S. PATENT DOCUMENTS

| 513,253 | 1/1894 | Warner | 24/511 |
| 1,281,913 | 10/1918 | Curley | 24/510 |
| 1,636,254 | 7/1927 | Standing | 24/500 |
| 1,728,040 | 9/1929 | Carl . | |
| 2,938,227 | 5/1960 | Lhota . | |
| 3,030,681 | 4/1962 | Phillips | 24/499 X |
| 3,079,010 | 2/1963 | Metzger . | |
| 3,475,783 | 11/1969 | Jorgensen . | |
| 3,631,994 | 1/1972 | Mackzum, Jr. . | |
| 3,668,528 | 6/1972 | Hutchinson et al. . | |
| 3,676,902 | 7/1972 | Pearson | 24/499 |
| 3,693,089 | 9/1972 | Hutchinson et al. . | |
| 3,711,893 | 1/1973 | King . | |
| 3,736,591 | 2/1973 | Rennels et al. . | |
| 4,073,090 | 2/1978 | Lucia . | |
| 4,083,481 | 4/1978 | Selinko . | |
| 4,100,653 | 7/1978 | Sensabaugh | 24/3 J |
| 4,193,164 | 3/1980 | Okayama | 16/DIG. 13 |
| 4,227,283 | 10/1980 | Mathewson et al. | 16/385 X |
| 4,228,738 | 10/1980 | Forshee | 248/548 X |

FOREIGN PATENT DOCUMENTS

| 88388 | 9/1983 | European Pat. Off. | 16/222 |
| 666748 | 2/1952 | United Kingdom | 16/385 |

Primary Examiner—William E. Lyddane
Assistant Examiner—James R. Brittain
Attorney, Agent, or Firm—Joseph T. Downey; Edward M. Roney; Donald B. Southard

[57] ABSTRACT

Belt clip assembly for use with a portable electronic apparatus includes a mounting bracket used to join a belt clip and a housing member. A mounting bracket is inserted through a pair of slots in a housing member and holds a belt clip in place by means of a pivot pin inserted through apertures in the mounting bracket and the belt clip. A pair of shear cuts adjacent the apertures in the mounting bracket allow the pivot pin to pull through the shear cuts in the event excess forces are applied to the belt clip, thereby destroying the mounting bracket. In this manner an inexpensive mounting bracket is sacrificed to avoid damage to the housing and the belt clip.

7 Claims, 5 Drawing Figures

BELT CLIP ASSEMBLY WITH A CONTROLLED FAILURE MODE

BACKGROUND OF THE INVENTION

1. Field of the Invention

This invention relates generally to the field of mounting clip assemblies for miniature electronic devices such as paging receivers. More particularly, this invention relates to the field of belt clip assemblies having a controlled manner of failure which results in major damage being confined to at most an inexpensive, sacrificial bracket. This controlled failure mode prevents damage to more expensive components and allows for inexpensive repair.

2. Background of the Invention

Belt clips or mounting clips of various configurations have been used for a number of years in portable electronic devices such as paging receivers. One of the most popular types is a spring loaded belt clip which serves as an attaching mechanism which allows the user to rapidly and securely attach the pager or other electronic device to the user's belt, pocket, or purse to make the device conveniently accessible yet securely mounted.

An exemplary prior art belt clip is used in the MOTOROLA PAGEBOY II TM pager which is shown in FIG. 1 in exploded view. This pager includes a plastic housing frame 10, which serves as the primary housing for the internal electronic circuitry. A substantially U-shaped housing cover 15 is made of metal and slides into slots 20 in housing frame 10. An opening 25 at the top of the housing cover 15 allows access to controls which are mounted on housing frame 10. It is interesting to note that housing cover 15 is utilized as the paging receiver's antenna in the MOTOROLA PAGEBOY pager II TM. This feature is described in U.S. Pat. No. 3,736,591 to Rennels, et al, the contents of which are hereby incorporated by reference.

On the rear surface of housing cover 15 a pair of tabs 30 are punched from holes 35 and bent outwardly at a right angle to the rear surface of housing cover 15. Each of these tabs 30 additionally have a circular hole 40 punched through them. The center of circular holes 40 lie along a substantially coaxial line.

A lanyard bracket 45 which is somewhat U-shaped also has a circular hole 50 on each side which is made to align with circular holes 40 when lanyard bracket 45 is inserted through holes 35 from the inside of housing cover 15. On one end of lanyard bracket 45 is a lanyard mount 55 including a hole for attaching a lanyard when the user prefers to suspend the pager from a lanyard rather than attach it to his belt.

A belt clip 60 including a passage 65 running through it is attached to the housing member 15 by means of a roll pin 70. A coil spring 75 is utilized to keep belt clip 60 in position so that the lower portion of clip 60 presses against housing member 15 thereby entrapping the user's belt.

When assembled, the roll pin passes through circular hole 40 to circular hole 50 into one side of passage 65 through the coil spring 75 and out the other end of passage 65 to the other circular hole 50 and the other circular hole 40. Support for the belt clip 60 and lanyard bracket 45 is provided by tabs 30 and roll pin 70. In order to open the belt clip, the user has simply to pull on the bottom of the belt clip away from housing cover 15 or push on the top of belt clip 60 toward the housing cover 15. The spring action of coil spring 75 urges the clip closed when pressure is released.

Although this clip arrangement functions well in normal use, when excess force is exerted on belt clip 60 in a direction which forces opening of the clip, the clip itself which is made AISI/ASTM designation 2024 Aluminum generally tends to break at point 80 severing the main body of the belt clip from the pager. This failure mode has been demonstrated to occur when approximately 23 to 30 pounds of opening force is exerted on a lower portion 85 of the belt clip.

Although this breaking force is reasonably high it is readily achieved, for example, when one inadvertently catches the pager on the arm of a chair, etc. while sitting down. Additionally, it is frequently the case that housing cover 15 is deformed in the process of breakage. Although it may be possible to straighten housing cover 15 somewhat and reuse it, since housing cover 15 forms the radio receiver's antenna, the antenna's reception pattern or other characteristics may be disturbed. It is frequently the case that when such an accident occurs, housing cover 15, roll pin 70, lanyard bracket 45, and belt clip 60 must all be replaced at substantial cost to the owner.

SUMMARY OF THE INVENTION

It is an object of the present invention to provide an improved belt clip assembly with a controlled failure mode.

It is another object of the present invention to provide a belt clip assembly which is more resistant to high opening force than the belt clip assemblies of the prior art.

It is a further object of the present invention to provide a belt clip assembly which is inexpensively repaired when failure does occur.

These and other objects of the invention will become apparent to those skilled in the art upon consideration of the following description of the invention.

In one embodiment of the present invention a mounting clip assembly having a controlled failure mode includes a housing member having an inner surface and an outer surface. A mounting clip is attached to the housing member by a bracket joining the belt clip and the housing member so that the mounting clip is operatively positioned adjacent the outer surface. The bracket includes a controlled failure mechanism which allows for the separating and detaching of the mounting clip and the housing member in the event excess separating forces are applied between the housing member and the mounting clip. In this manner, damage to the housing member or the mounting clip is minimized.

The features of the invention believed to be novel are set forth with particularity in the appended claims. The invention itself however, both as to organization and method of operation, together with further objects and advantages thereof, may be best understood by reference to the following description taken in conjunction with the accompanying drawings.

DETAILED DESCRIPTION OF THE PREFERRED EMBODIMENT

Figure 2:
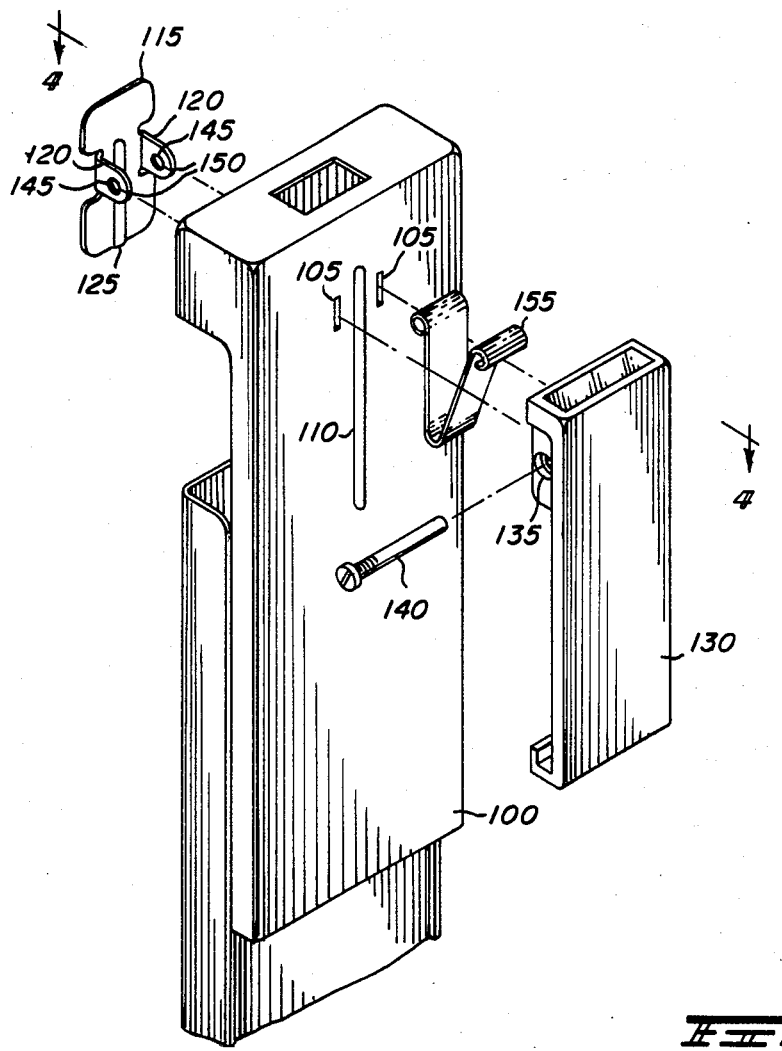
FIG. 2 is an exploded view of the belt clip arrangement of the present invention.

Turning now to FIG. 2 an exploded view of the preferred embodiment of the present invention is shown. A cover member or housing member 100 includes a pair of parallel slots 105 in the upper portion of the housing member. The housing member is preferably made of designation 2024 Aluminum and has a longitudinal dent or rib 110 for added strength.

A mounting bracket 115 preferably includes a pair of tabs 120 protruding at right angles from the body of the bracket. The bracket is appropriately dimensioned so that tabs 120 may be fitted through slots 105 from the inside surface of housing member 100. Mounting bracket 115 preferably includes a strengthening rib 125 which appropriately mates with rib 110 of housing member 100, but this is not to be limiting. Mounting bracket 115 is preferably made of designation 410 heat treated stainless steel and housing member 100 is preferrably made of designation 2024 aluminum.

A mounting clip or belt clip 130 which is preferably made of designation 2024 aluminum includes a passage 135 which is preferably threaded at one end for accepting a screw-in pivot pin 140. It will be clear to those skilled in the art that a roll pin or other pivoting mechanism could be used in place of pivot pin 140. Mounting bracket 115 includes a pair of substantially circular apertures 145 in tabs 120 with narrow slots or shear cuts 150 extending to the outermost ends of tabs 120. These shear cuts 150 provide for the controlled failure mechanism in the mounting bracket of present invention.

When assembled mounting bracket 115 has its tabs 120 inserted through one or more slots 105 from the inner surface of housing member 100. Belt clip 130 is aligned with mounting bracket 115 so that passage 135 is aligned with apertures 145. Screw-in pivot pin 140 is then inserted through the passage 135 and the apertures 145 and screwed into place. A spring which is preferrably a leaf spring 155 may be inserted into place between the housing member and the belt clip from the bottom after the belt clip is attached to the bracket by pivot pin 140. Spring 155 urges belt clip 130 into the normally closed position so that the lower end of belt clip 130 is directly adjacent the outer surface of housing member 100.

Figure 3:
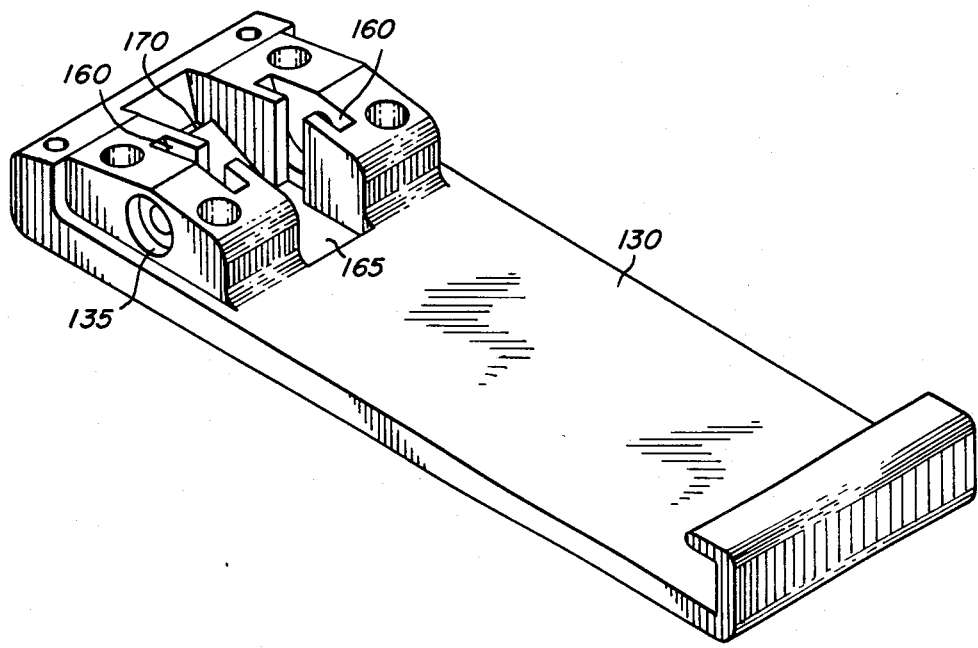
FIG. 3 shows a view of the belt clip of the present invention from the underside.

Turning now to FIG. 3, a more detailed drawing of the underside of the belt clip 130 is shown. Passage 135 is shown to have a threaded and counterbored section in one end to accept the screw head of screw-in pivot pin 140. A pair of slots 160 are positioned so as to accommodate tabs 120 during assembly. A central channel 165 having a tapered bottom surface is centrally located to accept leaf spring 155. The depth of channel 165 gradually decreases towards the upper end of belt clip 130 until it reaches a portion 170 near the end where the channel abruptly gets deeper in order to securely capture the end of leaf spring 165 when the spring is snapped into place. The preferred shape of this channel is more clearly shown in cross section in FIGS. 4 and 5.

Figure 4:
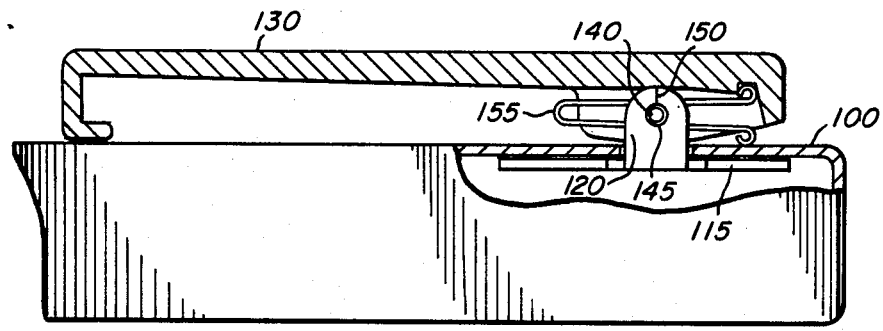
FIG. 4 is a partial sectional view of the assembly of FIG. 2 along section lines 4—4.

Turning now to FIG. 4 a cross section of the assembled belt clip arrangement is shown. Pivot pin 140 is shown to be captured within aperture 145 of tab 20. The relative position of spring 155 of the preferred embodiment is shown as it is captured in channel 165.

Figure 5:
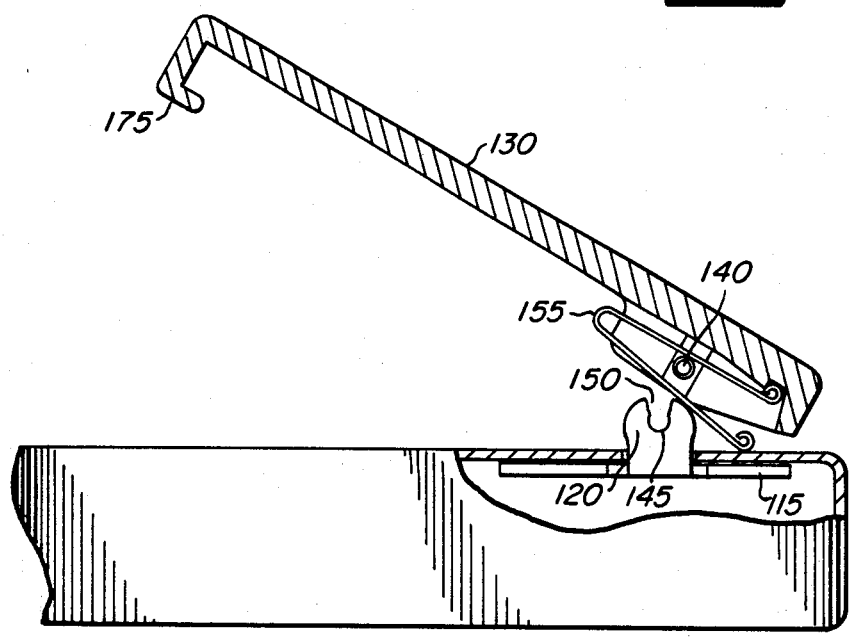
FIG. 5 shows the assembly of FIG. 4 just after excess forces have forced a controlled failure resulting in damage to the bracket assembly.

FIG. 5 shows the result of exerting excess opening forces to belt clip 130 at its lower end 175. When excess force is exerted, slots or shear cuts 150 of mounting bracket 115 open up under the force of screw-in pivot pin 140 pulling out of aperture 145. By appropriately selecting the characteristics of mounting bracket 115, the force at which this controlled failure mechanism occurs may be controlled. In the preferred embodiment, the thickness of bracket 115 is approximately 0.020 inches. The diameter of apertures 145 is approximately 0.066 inches and the radius from the edge or center of aperture 145 to the periphery of tab 120 is approximately 0.100 inches. Shear cut 150 is preferable, but those skilled in the art will recognize that a score line or a very narrow slot, for example, may also be adapted to work.

Figure 1:
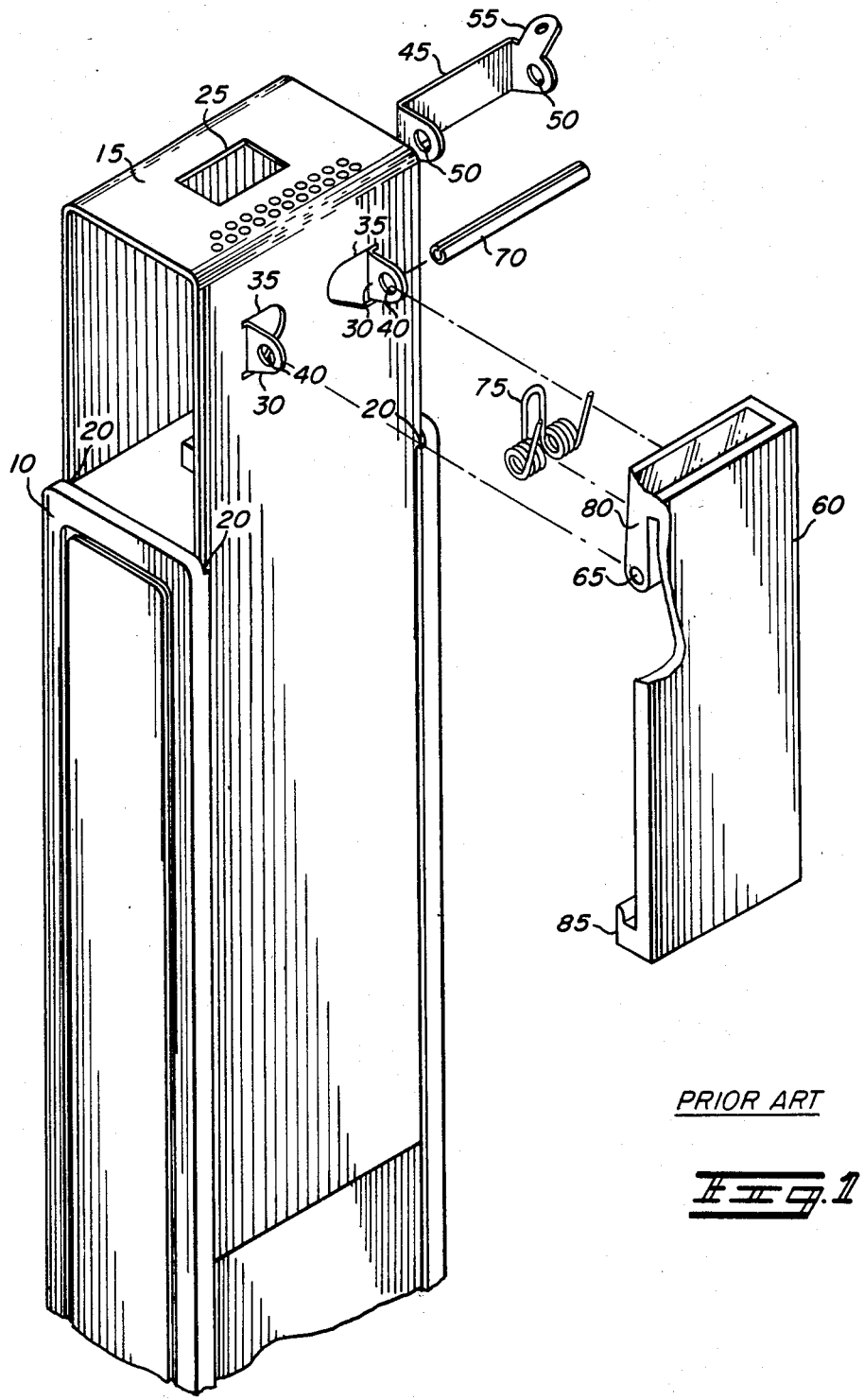
FIG. 1 is an exploded view of a belt clip arrangement of the prior art including cutaway portion of the belt clip.

With these dimensions, the belt clip breaks away when approximately 35 to 45 pounds of force is applied at point 175 of belt clip 130. It will be clear to those skilled in the art that this force is substantially higher than the breakaway force which damages the prior art pager clip of FIG. 1 making breakage less likely to occur. Housing member 100 must be appropriately strengthened to withstand that amount of force. However, when this breakaway does occur, the only component sustaining severe damage is mounting bracket 120 which, by comparison, is a very inexpensive part. The ease of assembly of the present configuration also greatly reduces the labor charges for servicing the damage.

It will be clear to those skilled in the art that other variations of mounting bracket 115 will be equally suitable for creating the controlled failure or sacrificial effect of the present bracket. Other variations which provide for a weakened portion which is designed to break in the presence of excessive force but sufficiently capture the belt clip for normal use in addition to other embodiments which may allow for reuse of the bracket will occur to those skilled in the art. It is also clear that the present invention may be practiced in conjunction with any mounting clip mechanisms such as lanyards and is therefore not limited to belt clips.

Thus it is apparent that in accordance with the present invention, an apparatus that fully satisfies the objectives, aims and advantages is set forth above. While the invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and broad scope of the appended claims.

What is claimed is:

1. A mounting clip assembly having a controlled mode of failure, comprising:
   a housing member including an inner surface and an outer surface;
   a mounting clip;
   a body member adjacent said inner surface of said housing member;
   a pair of tabs attached to said body member and projecting substantially perpendicular therefrom, each of said tabs including an outer edge and an aperature, said tabs projecting through slots in said housing member from said inner surface to said outer surface;

pivot means attached to said mounting clip, for pivotably attaching said mounting clip to said body member; and said tabs include controlled failure means for allowing said mounting clip and said housing member to separate upon application of a predetermined force between said housing member and said clip thereby minimizing damage to said housing member and said mounting clip.

2. The mounting clip assembly of claim 1, wherein said controlled failure means includes a slot in each of said tabs extending from said aperture to said outer edge of said tabs, whereby, said slot opens up to release said pivot means upon application of said predetermined force.

3. The mounting clip assembly of claim 2, wherein said slot is a shear cut.

4. The mounting clip assembly of claim 1, wherein said mounting clip is a belt clip and further including a spring positioned between said belt clip and said housing member for normally urging said belt clip closed.

5. The mounting clip assembly of claim 1, wherein said pivot means includes a pivot pin having two ends and having a threaded portion, and wherein said mounting clip has a passage with a threaded portion adapted to accept said pivot pin.

6. The mounting clip assembly of claim 5, wherein said pivot pin further includes a screw head at one of said ends and wherein said threaded portion is located adjacent said screw head.

7. A mounting clip assembly having a controlled mode of failure, comprising:
a housing member having an inner and an outer surface and a pair of slots extending from said inner to said outer surface;
a mounting clip;
a sacrifical mounting bracket including a body member adjacent said inner surface of said housing member, and a pair of tabs attached to said body member and projecting substantially perpendicular therefrom, each of said tabs including an outer edge and an aperture with a shear cut connecting said outer edge and said aperture, said tabs positioned through said slots in said housing member and extending outward from said outer surface; and
a pivot pin, attached to said mounting clip and passing through said apertures, for allowing said mounting clip to be pivotably attached to said housing;
whereby, upon application of a predetermined force between said mounting clip and said housing member the shear line opens up to allow said pivot pin to pass through.

* * * * *